United States Patent [19]

Wu

[11] Patent Number: 4,727,769

[45] Date of Patent: Mar. 1, 1988

[54] INTEGRATED MULTI-FUNCTION DIFFERENTIAL SYSTEM

[75] Inventor: Derong Wu, Shiyan, China

[73] Assignee: The Second Automobile Manufacture Plant, Hubei Province, China

[21] Appl. No.: 846,168

[22] Filed: Mar. 31, 1986

[30] Foreign Application Priority Data

Apr. 1, 1985 [CN] China ............... 85101984

[51] Int. Cl.$^4$ .......................... F16H 1/44; F16H 35/04
[52] U.S. Cl. .................... 74/710.5; 74/650; 180/249
[58] Field of Search ............... 74/650, 710.5; 180/247, 180/248, 249, 250

[56] References Cited

U.S. PATENT DOCUMENTS

| | | | |
|---|---|---|---|
| 1,212,795 | 1/1917 | Mayer et al. | 74/710.5 |
| 1,320,979 | 11/1919 | Bowen | 74/650 |
| 1,839,195 | 1/1932 | Bowen | 74/650 |
| 2,449,975 | 5/1948 | Robbins | 74/650 |
| 2,638,794 | 5/1953 | Knoblock | 74/650 |
| 3,505,888 | 4/1970 | Denkowski | 74/89.15 |
| 3,827,520 | 8/1974 | Mueller | 180/44 R |
| 4,070,924 | 1/1978 | Moreno et al. | 74/710.5 |
| 4,320,813 | 3/1982 | Manna | 180/249 |
| 4,347,760 | 9/1982 | Jewett | 74/710.5 |
| 4,407,387 | 10/1983 | Lindbert | 180/247 |
| 4,493,387 | 1/1985 | Lake et al. | 180/248 |
| 4,560,025 | 12/1985 | Suzuki et al. | 180/247 |
| 4,597,467 | 1/1986 | Stockton | 180/248 |
| 4,617,840 | 10/1986 | Yamakawa et al. | 180/247 X |

FOREIGN PATENT DOCUMENTS

| | | | |
|---|---|---|---|
| 0034315 | 8/1981 | European Pat. Off. | |
| 2138187 | 2/1973 | Fed. Rep. of Germany | 180/249 |
| 1355831 | 12/1964 | France | 180/250 |
| 304200 | 12/1932 | Italy | 74/650 |
| 42-15245 | 8/1967 | Japan | |
| 45-16406 | 8/1970 | Japan | |
| 0022531 | 2/1985 | Japan | 180/247 |
| 450458 | 7/1936 | United Kingdom | 74/650 |
| 561350 | 10/1944 | United Kingdom | |
| 2118666 | 11/1983 | United Kingdom | 180/247 |
| 2163107 | 2/1986 | United Kingdom | |

Primary Examiner—Dirk Wright
Attorney, Agent, or Firm—Armstrong, Nikaido, Marmelstein & Kubovcik

[57] ABSTRACT

Each drive axle of a vehicle has an identical lockable differential which is controlled by a pneumatic control circuit. The control circuit is responsive to the accelerator pedal and the direction of movement of the vehicle. Each differential has a sliding collar which actuates one set out of two sets of sliding blocks to lock the differential. The collar has two cam surfaces on its inner periphery to alternately engage the two sets of sliding blocks. The sliding blocks engage chock slots located in the outer surface of a center ring and slide in radially disposed bores perpendicular to the axis of rotation of the differential. The pneumatic control circuit has electric switches which regulate the air flow and simultaneously engage all of the differential locks.

5 Claims, 11 Drawing Figures 4,727,769

INTEGRATED MULTI-FUNCTION DIFFERENTIAL SYSTEM

This differential system is a novel integrated multi-function differential system. IMDS for short.

This invention, the unique IMDS, is designed for multi-axle-drive wheeled vehicles and is applied as a completely new differential device in the vehicle transmission system.

In the current multi-axle-drive transmission system, there is a differential device for each drive axle for adjusting the difference in speed of the wheels on either side. Such differentials act independently, with no interrelations between them. Each differential can only adjust the difference in speed between the two moving members (either two wheels or two axles). In order to obtain a difference in speed between the axles, there must be one more interaxle differential device in relation to every two drive-axles. Therefore several interaxle differentials are often required for the multi-axle-drive vehicles. What is more, although the conventional planetary differential can adjust the difference in speed either between the axles or the wheels, it decreases the crossing performance of the vehicle to a very large extent. If the conventional planetary differential is adopted between the axles and the wheels, and if any of the wheels mires down in mud skidding, the whole vehicle will be prevented from moving forward any farther. Thus it is necessary to solve the problem of how to prevent wheel skidding when interaxle differential devices are used.

For this purpose, there have been various applications of free-wheel mechanism principle in a number of countries. That is, when the turning difference between two axles comes up to a certain value, the interaxle differential is locked so as to avoid wheel skidding, such as The Structure Design of Eaton Company, U.S. and ALL-Wheel Control System of GKN Foxon (See Some Principles and Design Problems on Interaxle Connection in 4-Wheel drive vehicles, design Problems on Interaxle Connection in 4-Wheel drive vehicles, published in 'Automobile Techniques', April, 1983 PRC.) However, such structures or devices are only related to single differentials and if they are applied to multi-axle-drive vehicles, the structure would be too complicated.

Toothed self-locked differentials are capable of preventing wheel skidding effectively, yet it is but one of the conventional differentials and it can only adjust the difference in speed between two moving parts. To obtain the difference in speed for all wheels, it is necessary to install several interaxle self-locked differentials, with the structure still being very complicated and must cost as well.

So in some current multi-axle-drive vehicles, no interaxle differentials are used, i.e., when the vehicle runs smoothly, front-axle drive is not used and only the middle and the rearaxle drive are applied to get the vehicle moving. The front-axle drive is only engaged when the vehicle runs in poor road conditions. But this is not an ideal solution, for it is still possible to produce parasitic power if the problem of the difference in speed between the middle and the rear-axle is not settled. Besides, when the vehicle runs in the bad road conditions and the engagement of the front-axle drive is not done in time, sometimes the vehicle can not go through once it mires down in mud, even if you try to engage the front-axle drive again, thus greatly reducing the crossing possibility of the vehicle.

Now it is clear that traditional methods of obtaining the difference in speed for multi-axle-drive vehicles would make the structure more complicated, the cost increased and the performance is not ideal.

This invention is designed to make use of the existing inter-wheel differentials in each drive axle and integrate them as a whole to work coordinatively by a certain means of course, That is, to integrate all the separately functioned differentials into one called IMDS. This new differential system can not only play the original part but obtain the difference in speed for all axles and automatically prevent any wheel from skidding. In other words, without interaxle differentials, the difference in speed both between the wheels and among the axles can be obtained by means of our IMDS. Herein, this new system has the following functions:

(a) Capable of adjusting the difference in speed between wheel at each drive axle, (b) Capable of adjusting the difference in speed among all drive axles, (c) Capable self-locking and slide-preventing, and (d) Capable of breaking automatically the connection between the propeller shaft and the wheels in case of vehicle coasting so as to reduce the vehicle resistance and save fuel oil, or unbreaking the connection but still keeping the brake function of the engine at the discretion of the driver.

This system is based on the elementary design of toothed differentials, with several parts, such as position sliding blocks, sliding sleeves and gear shifting fork added, and by way of pneumatic drive system, all the central rings in the differential devices of the axles can be linked and operated in step, obtaining a function of the difference in speed both between the wheels and among the axles, and as a result, automatically preventing the wheels from skidding.

From the above-mentioned figures. it can be seen that there are two position sliding blocks (2) and (3) in different directions on the drive ring (1), which are used to fix the central ring (4) in two definite positions related to the drive ring (1). The sliding sleeve (5) is installed around the peripheral column, which can slide easily along the axis but can not turn around the column. When the sliding sleeve slides axially, one set of position sliding blocks is relaxed and the other is pressed down driving the central ring (4) in one direction.

Figure 2:
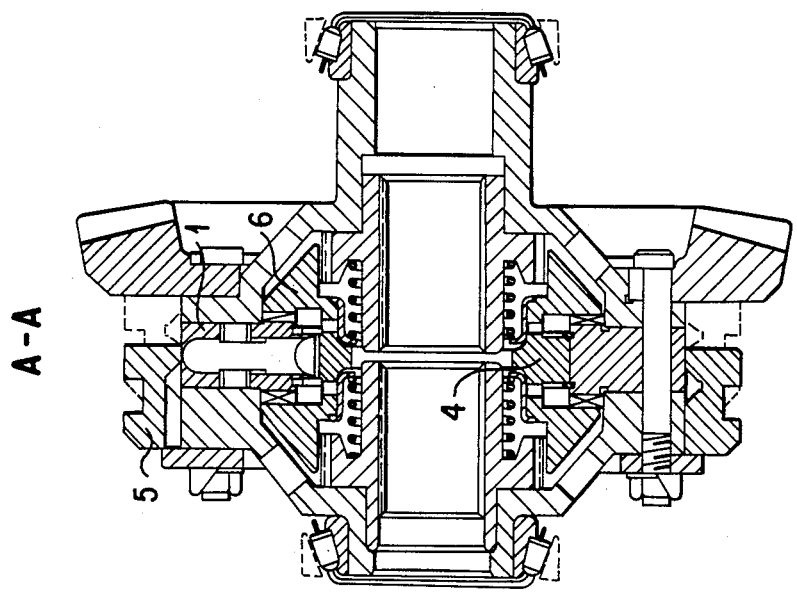
FIG. 2 is a sectional view taken along the line A—A of FIG. 1.
Figure 1:
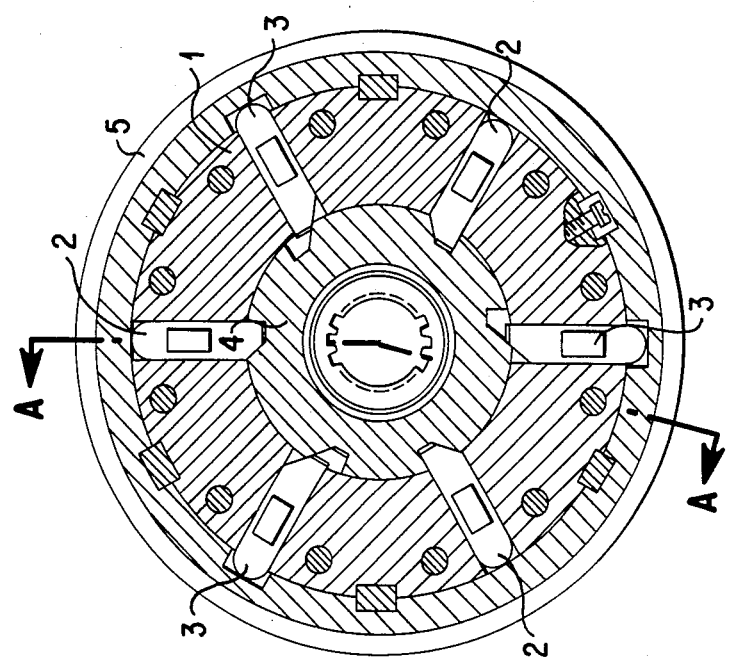
FIG. 1 is a sectional view of the differential device of the present invention.
Figure 3:
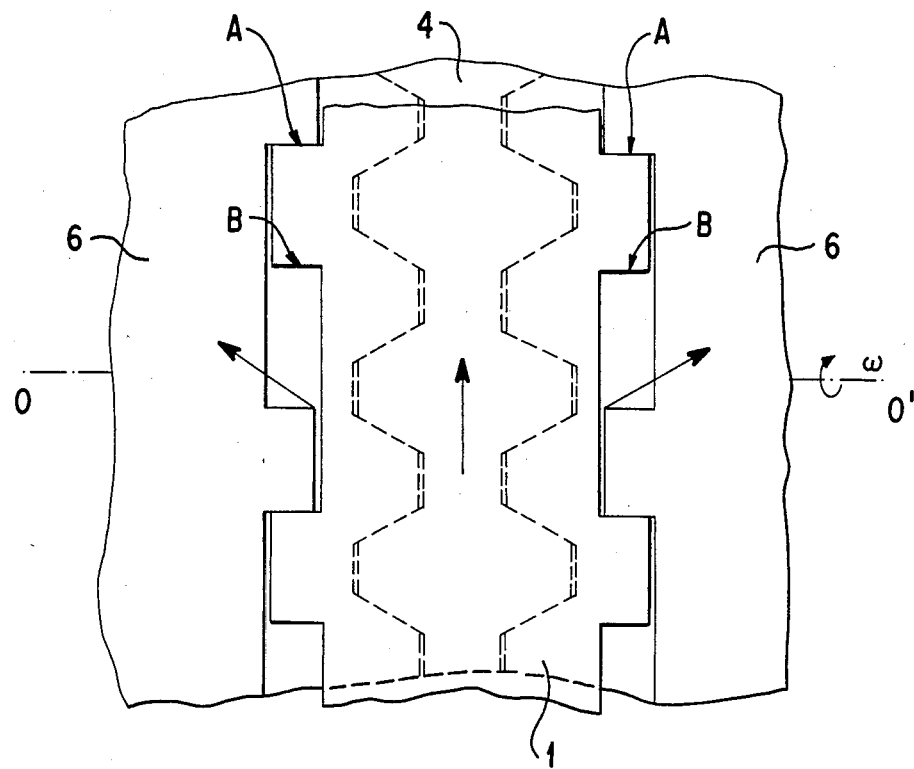
FIG. 3 illustrates the meshing relation of certain gears of the differential rotating in one direction.

The axial position of the sliding sleeve (5) is controlled by a pneumatic fork (Which is not shown in the figure.) The axial position of the sliding sleeve shown in the solid line illustrates that the sliding block (2) is being pressed down and the central ring (4) has been fixed to a definite position (Related to the drive ring (1)). Now the toothed engagement of the drive ring (1), the central ring (4) and the right and left half-axle clutch sleeves (6) is shown in FIG. 3. As the drive ring (1) has been fixed in relation to the central ring (4), they can be regarded as one. In this case, two clockwise free-wheel systems are formed by the drive-ring (1) and the right and left half-axle clutch sleeves (6) respectively, which are capable of transmitting the engine torque.

Tooth face A plays the part in the transmission of torque. The relative position of the central ring (4) will never change as long as the sliding sleeve (5) is not moved. Tooth face B does not play any role in the case.

Owing to the wheel-moving geometry, there is one wheel or two on either side of the axle, which, overleaping the drive ring (1), turns very fast at the same time. But because of the beveled tooth face of the central ring (4) which is fixed together with the drive ring, it would release the fast turning half-axle clutch sleeves in the direction along the beveled tooth face (see the arrow direction in FIG. 3,) and it would also realize free overspeed turning. Thus the multi-difference in speed between the wheels (when wheel on side is released.) or among the axles (when wheels on both sides are released.) is obtained.

Figure 4:
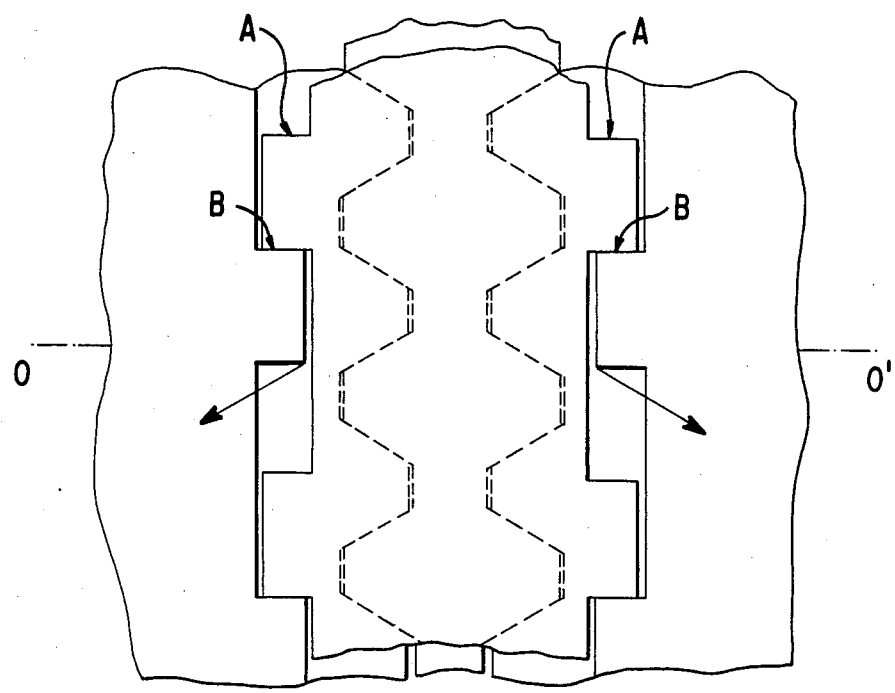
FIG. 4 is a view like FIG. 3 illustrating the meshing relation of certain gears of the differential rotably in the opposite direction.

On the one hand, when the vehicle reverses, the differentials must be shifted to the anti-clockwise free wheel system in time. On the other hand, when the vehicle goes one, it may use engine as a brake, the differentials must be identically shifted to anti-clockwise free wheel system in time. At this conjunction, the sliding sleeve (5) is moved axially to the other end by way of pneumatic control system, thus releasing sliding block (2) and pressing down sliding block (3), and the central ring (4) is fixed at another position related to the drive ring (1). The toothed engagement is shown in FIG. 4. Then the differential is changed to an anti-clockwise free wheel, and the back draft drive torque can be transmitted by means of tooth face B, or the engine brake can transferred when the vehicle runs forward.

In applying the engine as a brake to reduce the vehicle speed, if there exists the difference in speed between the wheels or among the axles, the slow-turning wheel does not move in conformity with the central ring and so is released to slowdown turning, the difference in speed being gained.

Therefore, if all the central rings of the differentials in each drive axle are fixed at the same positions related to their own drive rings, and all the half-axle clutch sleeves are formed free wheels in the same direction with their respective drive rings, the multi difference in speed between the wheels and among the axles can be reached in the whole system.

In order to make the working conditions of the differentials (clockwise or anti-clockwise free wheels) change automatically with the vehicle driving, various techniques may be adopted. The following are the two best applications of pneumatic control system.

Figure 6:
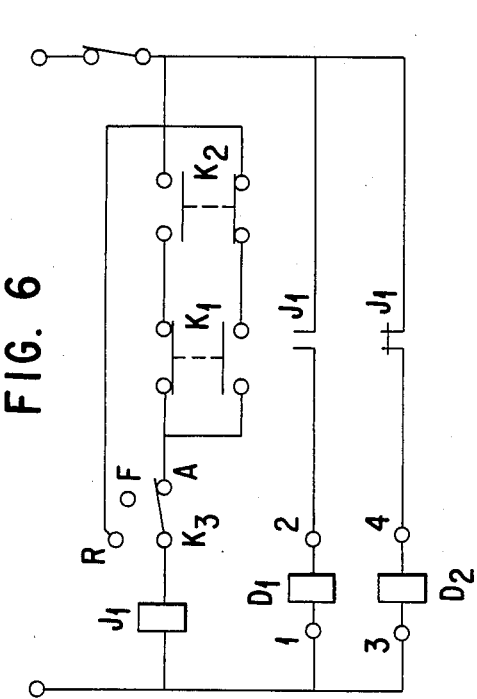
FIG. 6 is a schematic diagram of a control circuit used with the pneumatic control system of FIG. 5.
Figure 5:
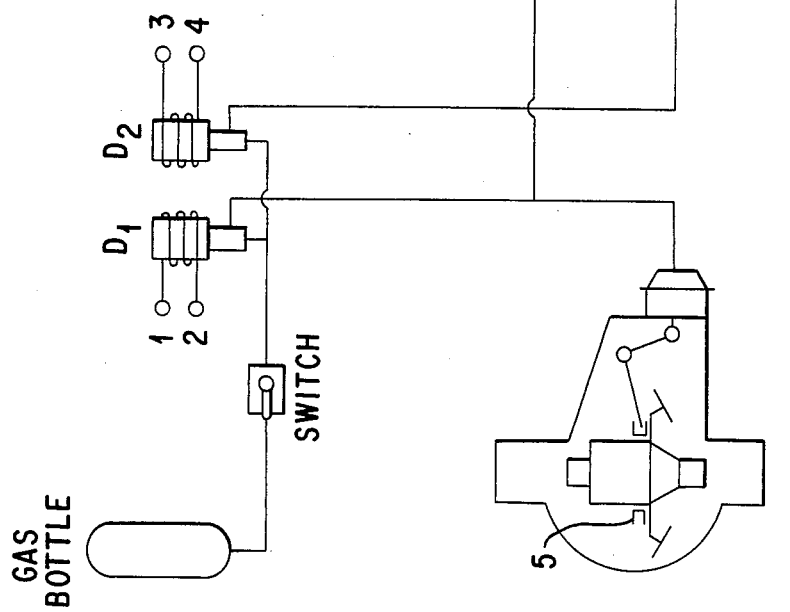
FIG. 5 is a diagrammatic illustration of a pneumatic control system in accordance with the present invention.
Figure 7:
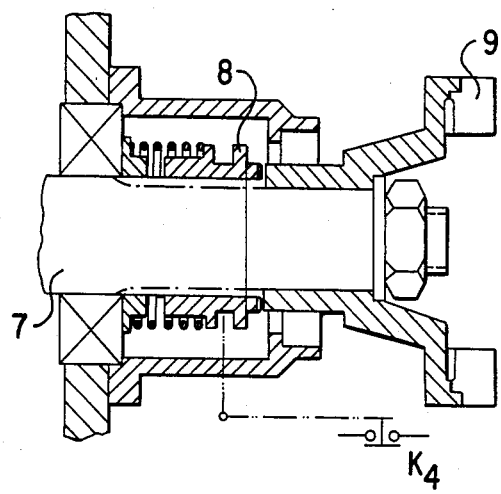
FIG. 7 is a sectional view of apparatus used in another embodiment of the present invention.
Figure 8:
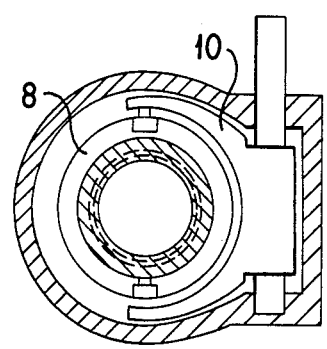
FIG. 8 is a sectional view showing an additional element useful in the apparatus of FIG. 7.

In the application shown in FIGS. 5 and 6, the control system is controlled by the position of the accelerator pedal and the shift of the gear box, in the drawings, D1 and D2 are two conventional electrically-controlled On-off air valves with their electromagnetic coils connected to the control circuit respectively. J1 is a 12-volt D.C connector and it often connects and disconnects the tip to control the on and off circuit of D1 and D2 respectively.

Micro-switch K1 works in connection with the accelerator. When the accelerator is fully released, the lower tip is connected by K1 and upper tip disconnected. When the accelerator is pressed down, K1 returns to its original position (see the figure).

Micro-switch K2 is in contact with the reverse speed of the vehicle. When the reverse gear is engaged, K2 is actuated to connect the upper tip and disconnect the lower tip. K2 returns when the reverse gear is disengaged.

When switch K3 gets in connection with point A, the control system can automatically change the differential state in accordance with the vehicle working conditions, thus bringing it to be a clockwise or anti-clockwise free wheel. The following cases can be mentioned to further describe it.

When the vehicle is driven forward, the gear box is picked up the forward gear, K2 returns and the lower tip gets connected: and the driver steps down the accelerator pedal, K1 returns and the upper tip is connected. Then the connector J1 is off, D1 is off thereafter, but D2 is on (see FIG. 6). The air system controlled by air valve D1 is cut off and the air control chambers in the differentials of the front and rear axles exhaust. The fork again makes the sliding sleeve return under the pressure of the spring, so that differentials of the first and third axles are in the clockwise free wheel state, and air valve D2 is open, the air chamber of the middle axle acts upon the fork to move the sliding sleeve, thus bringing the second axle differential in the clockwise free wheel state as well. Then all the drive axles can transmit the torque and obtain the difference in speed for all wheels.

When the engine is applied a brake to reduce the vehicle forward speed, the gear box picks up the forward gear, and the lower tip of K2 gets connected; and the accelerator pedal is completely released to activate K1 its lower tip gets connected. The connector J1 is on, D1 is on thereafter but D2 is off. In response, air valve D1 is open so that the air chambers in the first and third axles push the fork and sliding sleeves and the differentials are in the anticlockwise free wheel state; and the air valve D2 is closed, the air chamber in the second axle exhausts to bring the differential also to the anti-clockwise free wheel state by spring. In this way, all the drive axles can transmit the engine brake torque to the vehicle wheels, obtaining the difference in speed for all wheels.

When the vehicle is driven to reverse, the reverse gear in the gear box is engaged and K2 is activated to connect its upper tip. The driver steps down the accelerator pedal and K1 returns. The J1 is on. It is the same with the above-mentioned case that all the differentials of the first, second and third axles are in the anti-clockwise free wheel system and the vehicle reverse and the difference in speed can be accomplished.

When the vehicle reverses using the engine as a brake (reversing down hill), the reverse gear is engaged and the upper tip of K2 is connected; and the accelerator pedal is released completely, the lower tip of K1 gets connected, and then the connector J1 is off. It is the same as the first case when the vehicle is driven foward that all the differentials are in the clockwise free wheel system, and that the engine brake torque can be transmitted when the vehicle reverses and the multi difference in speed can be obtained.

If the vehicle drives in the better road conditions in the plain, the drive may control the working conditions of the differentials directly. In this case it is only necessary to turn K3 to point F and to cut off connector J1, so that the differentials are in the clockwise free wheel system and the engine torque can be transmitted to drive the vehicle forward. In driving, the driver may release the accelerator instead of changing the differential state when he wants to prolong the sliding distance of the vehicle. And then all the wheels can turn about very easily overleaping the drive ring (1), thus greatly reducing the sliding resistance and saving fuel oil.

If the engine brake is needed in the course of vehicle coasting, just step down the accelerator to make the engine turn in step with the wheels and turn K3 to point R. Then the connector J1 is on and the differential changes to anti-clockwise system. Thereafter, release the accelerator again and the vehicle comes to the engine stopping state.

The circuit of the pneumatic control system is parallel to the ignition coil of the engine, so that if the engine is put out, the control will be off, i.e., D1 and D2 are all off. The first and third axles controlled by air valve D1 are in the clockwise free wheel state, and the second in the anti-clockwise free wheel state. So the hand brake can be guaranteed to play its normal role whether the vehicle stops uphill or downhill.

Of course, this only refers to the vehicles with central hand brakes installed. If the vehicle applies a spring brake as its hand brake device, the whole design of the control system can be remarkably simplified.

Another application of the control system is shown in FIGS. 7-11. Here the working conditions of the differentials are controlled in accordance with the torque output of the engine. A torque sensor is installed at the end of the gear box torque output shaft (7), which is made up of the small sliding sleeve (8) and the universal joint yoke (9). The small sliding sleeve (8) is matched to the shaft (7) by the splined spindle that can slide axially. The universal joint yoke can turn about the shaft very easily. The engine torque is transmitted, by way of the splined spindle, to the small sliding sleeve (8) through the gear box output shaft (7) and then to the universal joint yoke by the toothed gear.

Figure 10:
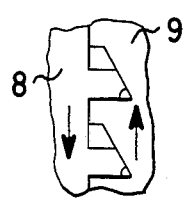
FIGS. 10 and 11 illustrate the toothed engagement of certain elements of the apparatus of FIG. 7 under different conditions of operation.

When the gear box output torque is positive, (which is equivalent to the case when the vehicle runs forward by the engine, or the case when the vehicle reverses downhill by the engine brake), the toothed gears are in the state of full depth engagement as shown by FIG. 10, and the fork acts upon the rocking arm to disconnect the tip of switch K4. Then the connector J2 is off, all the differentials are in the clockwise free wheel state so as to transmit the positive torque of the engine.

Figure 11:
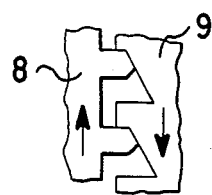
Figure 9:
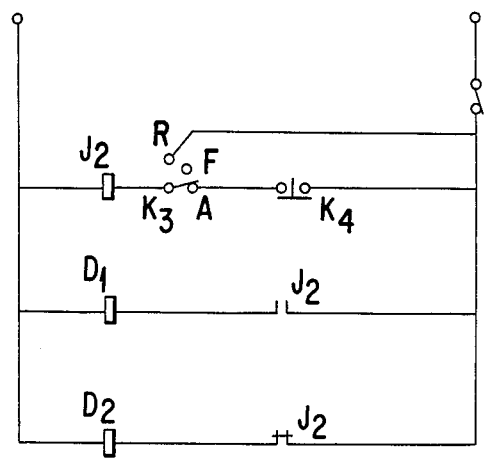
FIG. 9 is a schematic diagram of a control circuit useful with the apparatus of FIG. 7.

When the negative torque is transmitted by the gear box (which is equivalent to the vehicle reverse, or to the case when the vehicle runs forward by the engine brake), the toothed gears are half-depth engaged as shown by FIG. 11, and the sliding sleeve (8) overcomes the spring action and slide axially, so that the fork acts upon the rocking arm to release K4 and connects its tip.

Then connector J2 is on, and all the differentials are in the anti-clockwise free wheel system.

The remarkable effects of our system can be seen from the comparison and analysis below.

The complexity to arrange the transmission difference in speed among the axles in the multi-axle drive vehicles by means of conventional methods would become notably complicated with the increase of the drive axles. For example, two interaxle self-locked differentials are needed for 3-drive-axle vehicles, and three interaxle self-locked differentials are needed for 4-drive-axle vehicles and so on. But if our IMDS is applied in place of the original separate differentials, the problem of obtaining the difference in speed both between the wheels and among the axles can be solved at the same time, and the problem of wheel skidding can be prevented automatically as well. Therefore without the application of all the interaxle self-lock differentials, the problem of the difference in speed among the axles in the multi axle drive vehicles can be well settled. Besides, the complexity and cost of manufacture of IMDS don't change much with the increased number of drive axles. So it is ideal for the multi-axle drive vehicles with high cross-country ability, such as 3-drive-axle and 4-drive-axle vehicles.

Compared to the off-road vehicles without interaxle differentials, the parasatic power can be completely got rid of, the fuel oil saved and the wearing of the tire and the transmission system reduced when our IMDS is applied. In addition, with the self-lock differential system for all wheels, the front drive axle can be engaged earlier before the vehicle comes to the poor road conditions, thus increasing the cross-country ability and not to damage the transmission system.

What is claimed is:

1. An integrated multi-axle-drive differential system capable of reacting simultaneously to a difference in speed between the axles or the wheels of a vehicle having multiple drive axles comprising:
   a differential associated with each drive axle, each said differential including a drive ring, a center ring and two axle shaft clutch sleeves,
   means connecting each axle shaft clutch sleeve to a respective axle shaft of said drive axle,
   means providing a rotary driving gear connection between said drive ring and each of said axle shaft clutch sleeves,
   a beveled tooth overriding gear connection between said center ring and each of said axle shaft clutch sleeves,
   a plurality of bores extending radially through said drive ring,
   a plurality of chock slots open through the outer periphery of said center ring, each said chock slot being radially aligned with one of said bores through said drive ring and having a rotary driving surface, adjacent ones of said chock slots having said rotary driving surfaces facing in opposite directions,
   two sets of cylindrical sliding blocks with each sliding block mounted in one of said bores through said drive ring, each said sliding block having a radially inner end adapted for reciprocal movement into and out of rotary driving engagement with a driving surface of a corresponding one of said chock slots,
   a sliding sleeve axially movably mounted on the outer cylindrical surface of said drive ring, said sliding sleeve having axially spaced internal camming means and being movable relative to said drive ring from a first position wherein one of said axially spaced camming means engages one of said sets of sliding blocks and moves the radially inner ends thereof into driving engagement with said corresponding driving surfaces of said chock slots and a second position wherein the other said axially spaced camming means engages the other said set of sliding blocks and moves the radially inner ends thereof into rotary driving engagment with said corresponding driving surfaces of said chock slots, and means permitting manual or automatic control to effect simultaneous movement of the axially movable sliding sleeves of all of said differentials depending upon the condition of the accelerator and direction of movement of said vehicle.

2. The integrated differential systems defined by claim 1 wherein said means permitting automatic control to effect simultaneous movement of the sleeves of all of said differentials includes a control circuit, pneumatic means for moving each of said sleeves, electrically operated valves controlling the flow of compressed air to and from said pneumatic means and switch means in said control circuit associated with the accelerator and gear box of said vehicle whereby the simultaneous movement of all of said sleeves is automatically controlled as a function of the condition of said accelerator and the direction of movement of said vehicle.

3. The integrated differential system defined by claim 1 wherein said means permitting automatic control to effect simultaneous movement of the sleeves of all of said differentials includes a control circuit, pneumatic means for moving each of said sleeves, electrically operated valves controlling the flow of compressed air to and from said pneumatic means and switch means in said control circuit responsive to the direction of torque output of the vehicle gear box.

4. The integrated differential system defined by claim 3 wherein said switch means in said control circuit is operated by a torque direction sensor comprised of a sleeve connected for rotation with the gear box output shaft, a universal joint yoke mounted for rotary movement on said gear box output shaft, a toothed connection transmitting torque between said sleeve and said universal joint yoke, said toothed connection axially displacing one of said sleeve and said universal joint yoke relative to the other when the direction of rotation of said gear box output shaft is reversed and means changing the condition of said switch means in said control circuit in response to said axial displacement of one of said sleeve and said universal joint yoke relative to the other.

5. The integrated differential system defined by claim 4 wherein said sleeve is axially movable relative to said universal joint yoke, a spring biases said sleeve into said toothed connection with said universal joint yoke and movement of said sleeve relative to said universal joint connection changes the condition of said switch means.

* * * * *